United States Patent
Lin et al.

(10) Patent No.: US 8,952,922 B2
(45) Date of Patent: Feb. 10, 2015

(54) SENSING UNIT, SENSING ARRANGEMENT AND SENSING METHOD FOR TOUCH PANEL APPLICATION

(75) Inventors: Chia-Hsing Lin, Hsinchu (TW); Yi-Hsin Tao, Hsinchu (TW); Wen-Jun Hsu, Hsinchu (TW); I-Shu Lee, Keelung (TW); Shih-Yuan Hsu, Yunlin County (TW)

(73) Assignee: Elan Microelectronics Corporation, Hsinchu (TW)

(*) Notice: Subject to any disclaimer, the term of this patent is extended or adjusted under 35 U.S.C. 154(b) by 952 days.

(21) Appl. No.: 13/095,134

(22) Filed: Apr. 27, 2011

(65) Prior Publication Data
US 2011/0267312 A1     Nov. 3, 2011

(30) Foreign Application Priority Data
Apr. 30, 2010   (TW) ............................. 99113879 A (51) Int. Cl.
| | |
|---|---|
| *G06F 3/045* | (2006.01) |
| *G06F 3/041* | (2006.01) |
| *G01R 27/26* | (2006.01) |
| *G06F 3/044* | (2006.01) |

(52) U.S. Cl.
CPC ...... *G06F 3/044* (2013.01); *G06F 2203/04107* (2013.01)
USPC ........... 345/174; 345/173; 324/658; 324/686; 324/678

(58) Field of Classification Search
CPC .................. G06F 3/041–3/0418; G06F 3/044; G06F 2201/82
USPC ................... 345/173–174; 324/600, 658–690
See application file for complete search history.

(56) References Cited

U.S. PATENT DOCUMENTS

| | | | |
|---|---|---|---|
| 5,861,583 A * | 1/1999 | Schediwy et al. | 178/18.06 |
| 6,452,514 B1 | 9/2002 | Philipp | |
| 7,541,816 B1 | 6/2009 | Liao et al. | |
| 2008/0278178 A1 | 11/2008 | Philipp | |
| 2010/0060610 A1 | 3/2010 | Wu | |
| 2010/0214232 A1 * | 8/2010 | Chan et al. | 345/173 |
| 2012/0043971 A1 * | 2/2012 | Maharyta | 324/658 |

FOREIGN PATENT DOCUMENTS

| | | |
|---|---|---|
| TW | 201011620 A | 3/2010 |
| TW | 201015412 A | 4/2010 |

* cited by examiner

*Primary Examiner* — Kathy Wang-Hurst
*Assistant Examiner* — David Tung
(74) *Attorney, Agent, or Firm* — Muncy, Geissler, Olds & Lowe, P.C.

(57) ABSTRACT

Two sensing units are configured as an exciter and a sensor connected to two trace lines, respectively, for mutual capacitance sensing from the capacitance units including these two trace lines. The two sensing units connect the two trace lines together to balance them to a same voltage level first, and then disconnect them from each other. Thereafter, the exciter connects the first trace line to an excitation node to induce a charge change on the second trace line, and the sensor senses the charge change to detect the variation of the mutual capacitance between the two trace lines.

10 Claims, 11 Drawing Sheets

SENSING UNIT, SENSING ARRANGEMENT AND SENSING METHOD FOR TOUCH PANEL APPLICATION

FIELD OF THE INVENTION

The present invention is related generally to touch panels and, more particularly, to a sensing unit, sensing arrangement and sensing method for touch panel application.

BACKGROUND OF THE INVENTION

Figure 1:
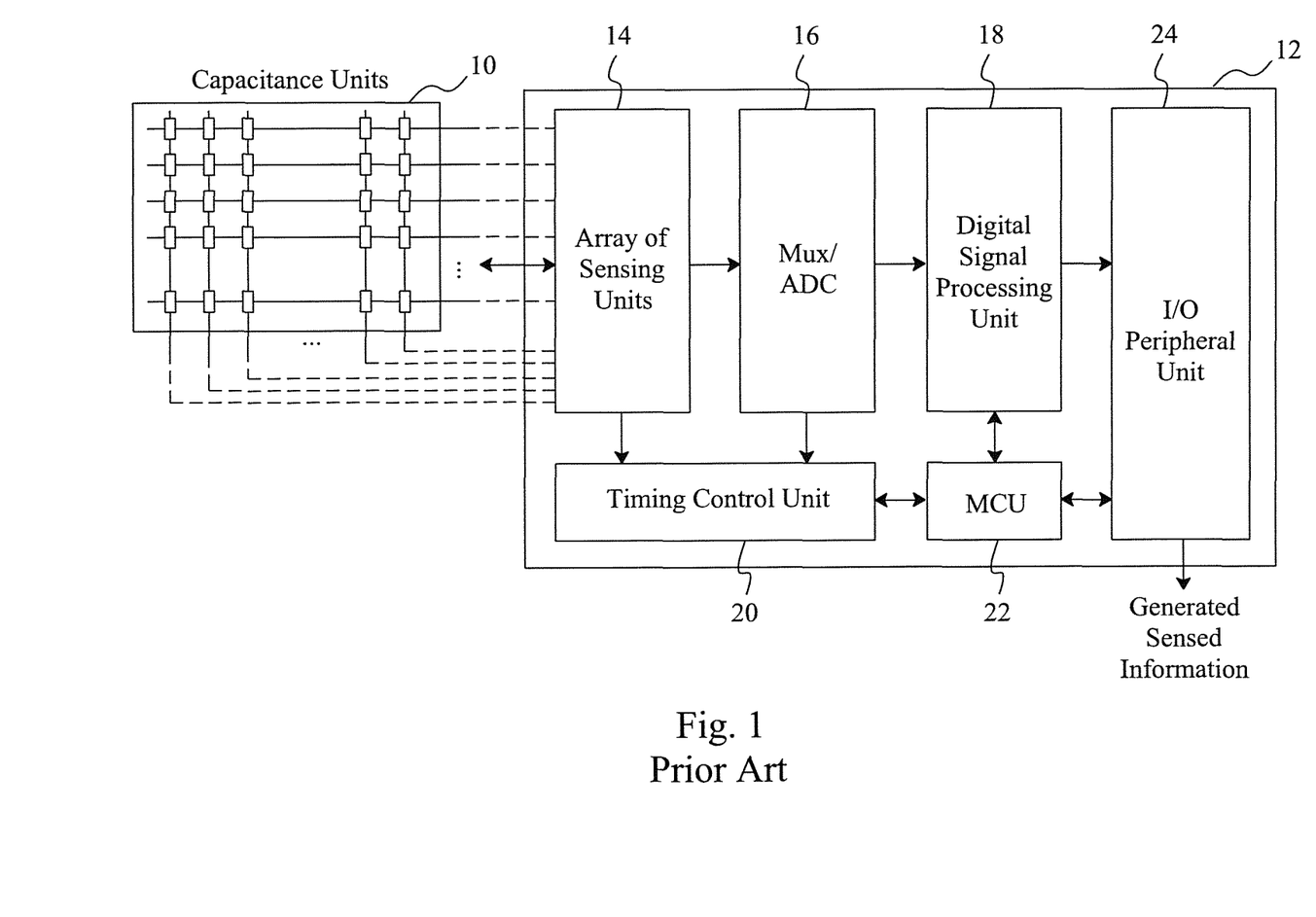
FIG. 1 schematically depicts a touch panel sensing system.

FIG. 1 schematically depicts a touch panel sensing system, which includes an array of capacitance units 10 where external object movement will induce capacitance variation on parts of the capacitance units 10, and a sensing chip 12 where object movement induced capacitance variation will be sensed and processed such that object movement information can be generated for further use. The sensing chip 12 includes an array of sensing units 14 for sensing external capacitance variation, a multiplexer/analog-to-digital converter (Mux/ADC) 16 for converting sensed output into digital information, a digital signal processing unit 18 for filtering, calculating required sensed information, and a timing control unit 20, a microcontroller unit (MCU) 22 and an I/O peripheral unit 24 for control of whole system operation and information input/output.

Such a two-dimensional touch panel sensing system has been widely applied to various electronic products as an input device, while suffering problems such as multi-touch positioning and interference caused by moisture or water droplets. Sensing the mutual capacitance between trace lines is effective in facilitating multi-touch positioning and telling water droplets from operators' fingers.

U.S. Pat. Application No. 20090273573 and U.S. Pat. Nos. 6,452,514 and 7,352,192 have disclosed various mutual capacitance sensing structures and methods. However, these arts need a large signal generator, for example a pulse width modulation (PWM) pulse generator, for better output performance, or more complicated circuits for more accurate measurement.

SUMMARY OF THE INVENTION

An objective of the present invention is to provide a sensing unit, sensing arrangement and sensing method for touch panel application.

According to the present invention, a sensing arrangement for touch panel application includes two sensing units connected to two trace lines, respectively. The first sensing unit is configured as an exciter, and the second sensing unit is configured as a sensor. The two sensing units connect the two trace lines together by an equalization line, to balance the two trace lines to a predefined voltage level first, and then disconnect the two trace lines from each other. Thereafter, the exciter connects the first trace line to an excitation node to induce a charge change on the second trace line, and the sensor senses the charge change to detect the variation of the mutual capacitance between the two trace lines.

According to the present invention, a sensing unit for touch panel application includes a switch arrangement, a current mirror and a sample switch. The switch arrangement controls the operational phase of the sensing unit. During an equalization phase when the sensing unit operates with either an exciter mode or a sensor mode, the current mirror supplies a charge current to a connected trace line. During an excitation phase when the sensing unit operates with the sensor mode, the current mirror generates a mirror current depending on the charge change on the connected trace line, and the sample switch is on to supply the mirror current to an output node.

According to the present invention, a sensing method for touch panel application includes connecting two trace lines together to balance them to a predefined voltage level first, and then disconnecting the two trace lines from each other. Thereafter, the first trace line is connected to an excitation node to induce a charge change on the second trace line, and the charge change is sensed to generate a mirror current supplied to an output node.

According to the present invention, a sensing method for touch panel application includes defining a plurality of area partitions on a touch panel, obtaining and storing a reference projected mutual capacitance for each area partition, sensing the projected mutual capacitance for each area partition to compare with a threshold, and, if an area partition has a difference between the reference projected mutual capacitance and the sensed projected mutual capacitance larger than the threshold, a sub-area scan of this area partition is performed to calculate an object location.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 2:
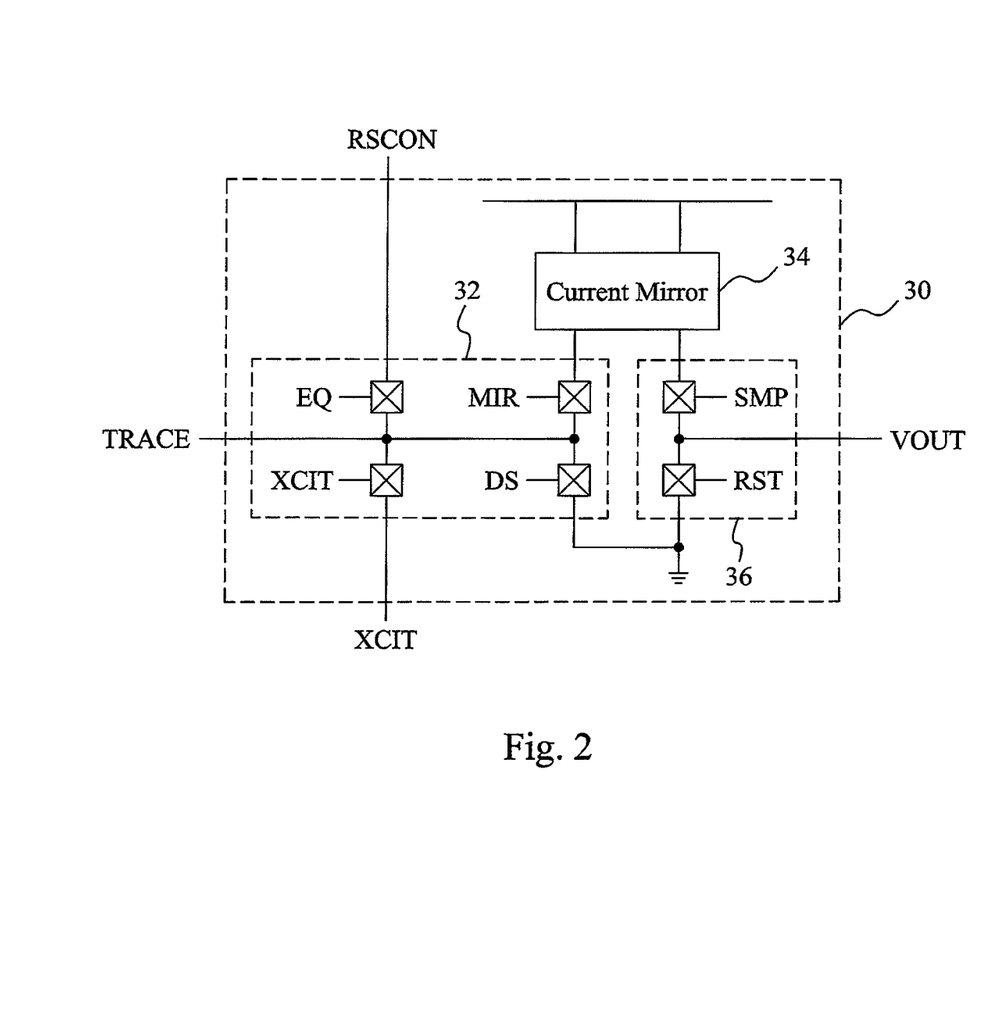
FIG. 2 shows a sensing unit according to the present invention.
Figure 3:
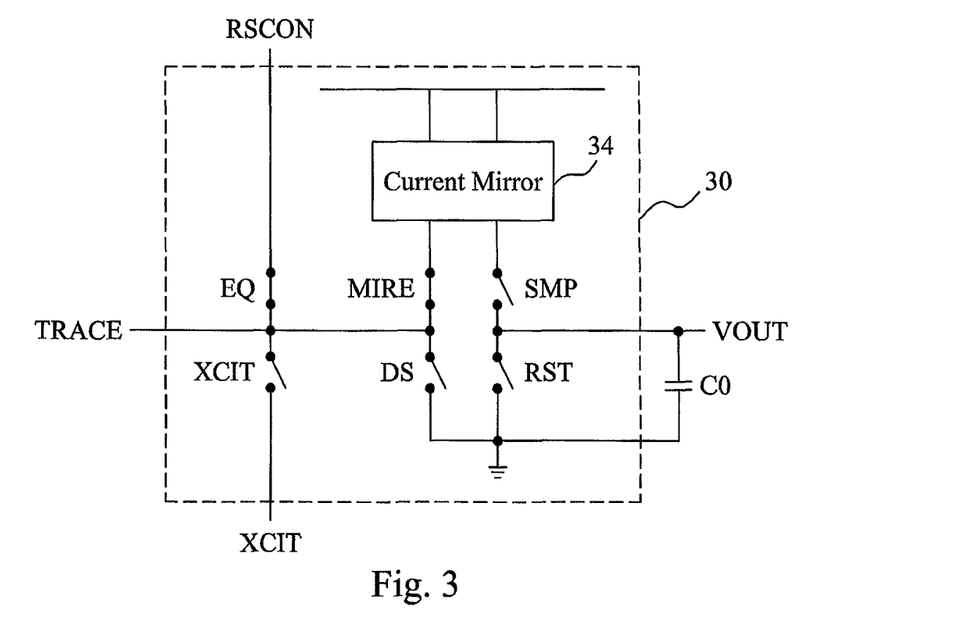
FIG. 3 is a circuit diagram of the sensing unit shown in FIG. 2 during an equalization phase when the sensing unit is configured as an exciter.
Figure 4:
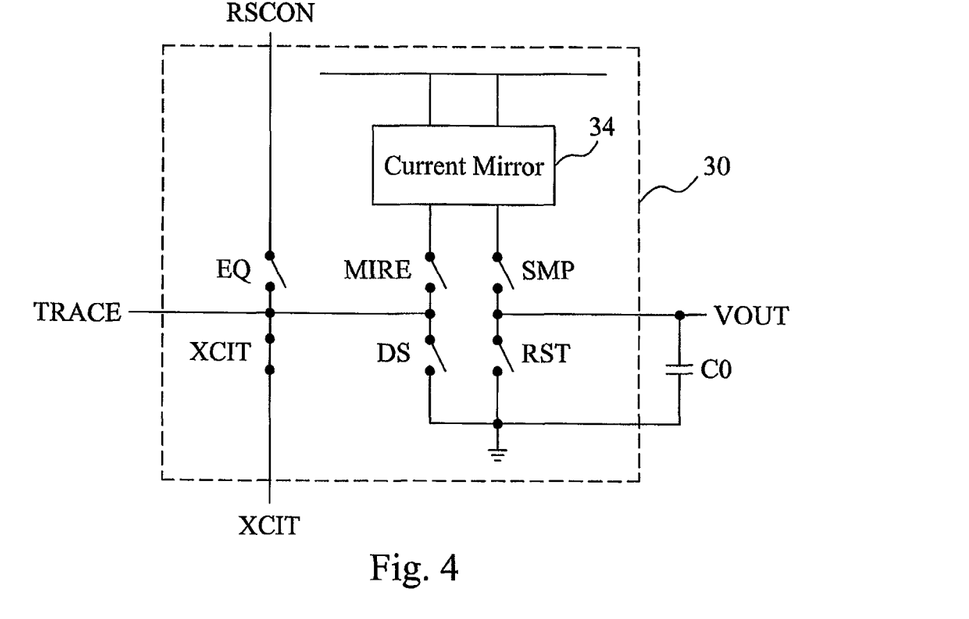
FIG. 4 is a circuit diagram of the sensing unit shown in FIG. 2 during an excitation phase when the sensing unit is configured as an exciter.
Figure 5:
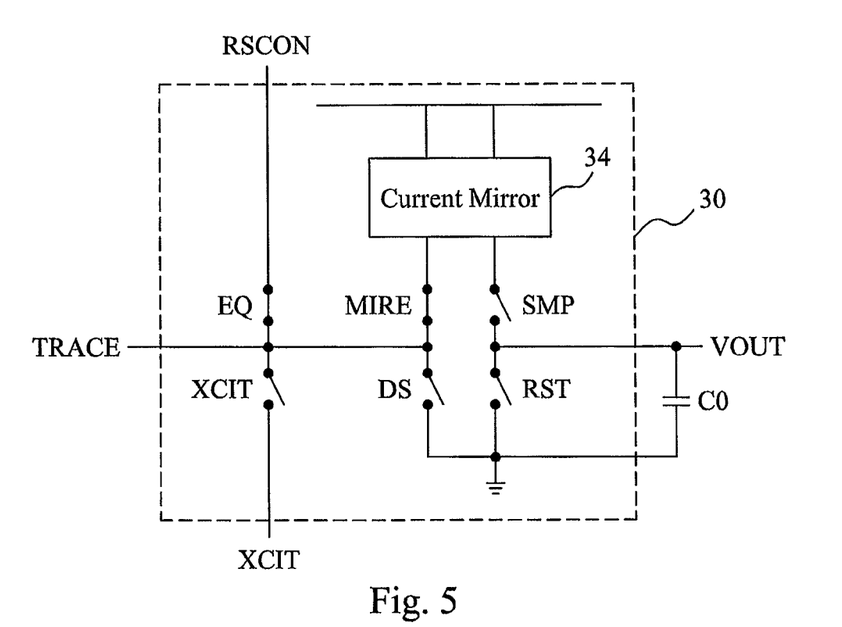
FIG. 5 is a circuit diagram of the sensing unit shown in FIG. 2 during an equalization phase when the sensing unit is configured as a sensor.
Figure 6:
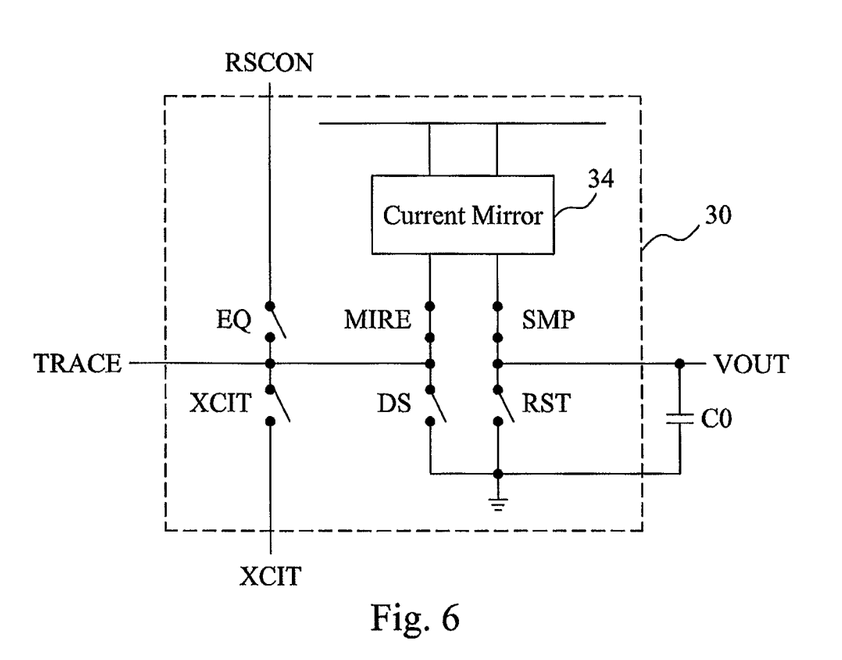
FIG. 6 is a circuit diagram of the sensing unit shown in FIG. 2 during an excitation phase when the sensing unit is configured as a sensor.

FIG. 2 shows a sensing unit 30 according to the present invention to construct the array of sensing units 14 shown in FIG. 1, which has a variety of operational modes, for example, including an exciter mode to operate as an excitation source, a sensor mode to operate as a sensing component, a fixed-driven mode for a connected trace line TRACE to be driven by a fixed voltage source, and a non-driven mode to make the trace line TRACE floating without driving. In addition to some control signals for mode select and phase control lines, the sensing unit 30 can drive the trace line TRACE from the touch panel, drive an output node VOUT where sensed output to be generated and processed, and selectively connect to an equalization node RSCON and an excitation node XCIT for capacitance sensing operation. In this embodiment, the sensing unit 30 includes switches EQ, XCIT, MIR and DS to control the operational phase of the sensing unit 30, a current mirror 34 to sense the charge change on the connected trace line TRACE, a reset switch RST to reset the output voltage VOUT, and a sample switch SMP to sample the current converted by the current mirror 34. For convenience of description, the switches EQ, XCIT MIR and DS are grouped as a first switch arrangement 32, and the switches SMP and RST are grouped as a second switch arrangement 36. The sensing unit 30 includes an equalization phase and an excitation phase when operating with either the exciter mode or the sensor mode. During the equalization phase when the sensing unit 30 operates with the exciter mode, as shown in FIG. 3, the trace line TRACE will be connected to the equalization node RSCON and driven by the current source 34. During the excitation phase when the sensing unit 30 operates with the exciter mode, as shown in FIG. 4, the trace line TRACE will be driven to a certain physically defined voltage level through the excitation switch XCIT, such that a voltage change will be generated on the trace line TRACE. During the equalization phase when the sensing unit 30 operates with the sensor mode, as shown in FIG. 5, the trace line TRACE will be connected to the equalization node RSCON and also driven by the current source 34. During the excitation phase when the sensing unit 30 operates with the sensor mode, as shown in FIG. 6, the sensing unit 30 will act as a current mirror component, such that the total charge changed on the sensed trace line TRACE which is induced by a voltage change on the exciter will be collected to the output node VOUT as the sensed output, and a capacitor C0 on the output node VOUT acts as a charge integrator. When connected to the trace line TRACE, the current mirror 34 will supply a charge current to the trace line TRACE, and may sense the variation of the charge current to generate a mirror current to the output node VOUT. The mirror current generated by the current mirror 34 and the charge current are at a fixed ratio with respect to each other, in which one may be equal to the other or may be scaled up or down from the other. The mirror current flowing to the output node VOUT will be accumulated by the capacitor C0 for back-end processing. In another embodiment, the excitation node XCIT is grounded, so the switches XCIT and DS can be integrated as a single switch. In yet another embodiment, the reset switch RST may be located on the external device that accumulates the mirror current.

Figure 7:
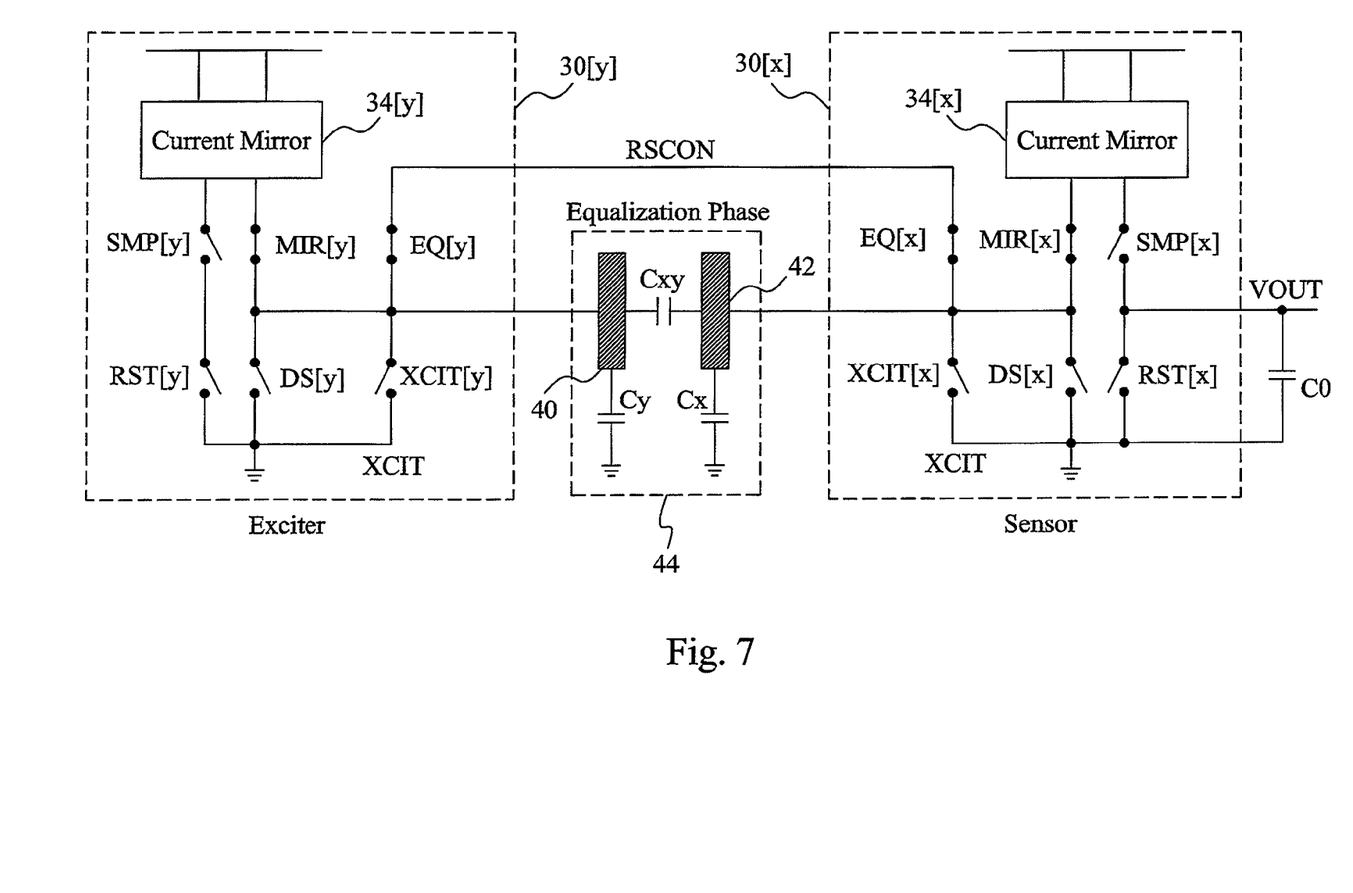
FIG. 7 is a circuit diagram of a sensing arrangement during an equalization phase in a first embodiment according to the present invention.
Figure 8:
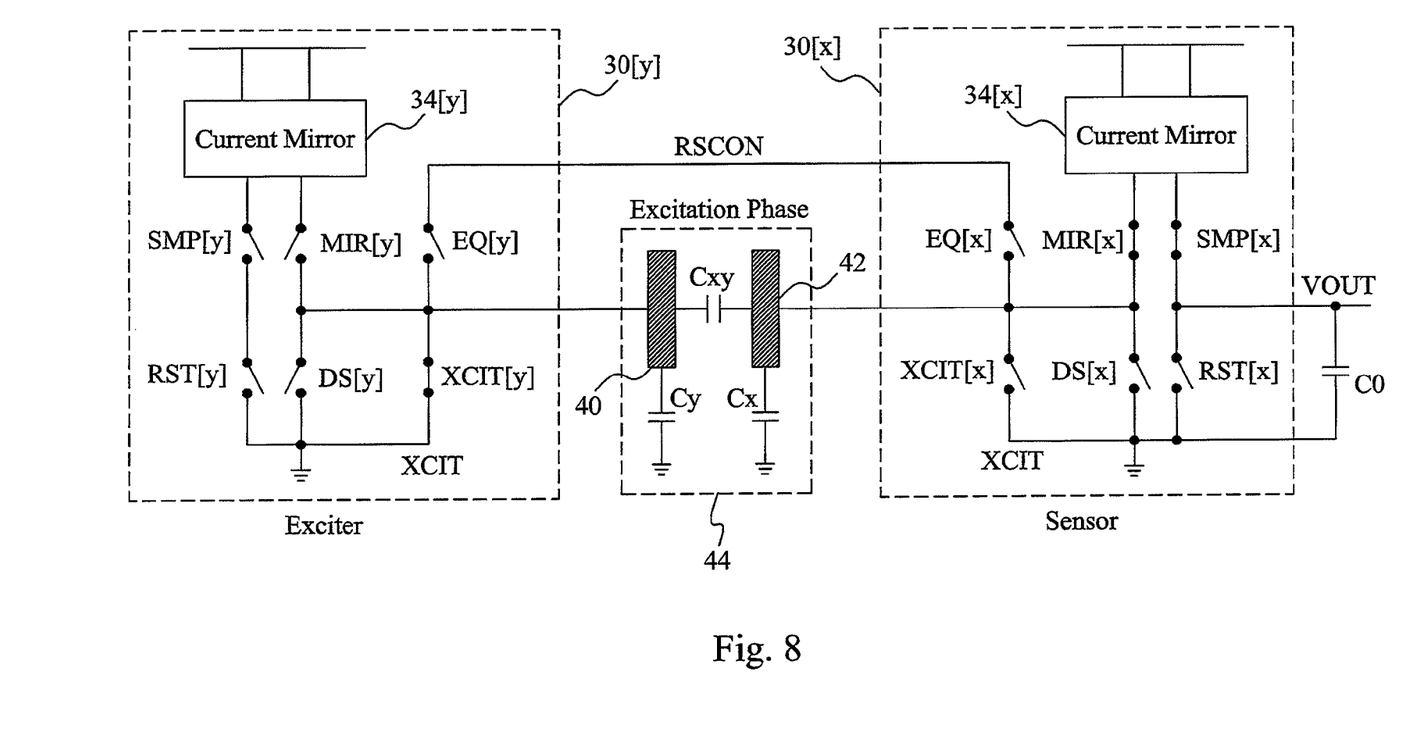
FIG. 8 is a circuit diagram of the sensing arrangement shown in FIG. 7 during an excitation phase.

FIGS. 7 and 8 illustrate a first embodiment of a sensing method using the sensing unit 30 according to the present invention. To sense the mutual capacitance Cxy between two trace lines 40 and 42 in capacitance units 44, a sensing arrangement according to the present invention includes a sensing unit 30[y] connected to the trace line 40, a sensing unit 30[x] connected to the trace line 42, and an equalization line RSCON connected between the sensing units 30[x] and 30[y]. The sensing unit 30[y] operates with the exciter mode, and the sensing unit 30[x] operates with the sensor mode. In the equalization phase, as shown in FIG. 7, the sensing units 30[x] and 30[y] turn on the switches EQ[x], EQ[y], MIR[x] and MIR[y], so that the equalization line RSCON will balance the trace lines 40 and 42 to a voltage level, which is determined by the designed voltage of the current mirrors 34[x] and 34[y]. Then, the sensing arrangement switches to the excitation phase, as shown in FIG. 8, the sensing unit 30[y] turns off the equalization switch EQ [y] and turns on the excitation switch XCIT[y], so that the trace line 40 is connected to the excitation node XCIT and in this case the excitation node XCIT is grounded to generate a largest voltage change, thereby the voltage of the trace line 42 declining. For compensating the voltage of the trace line 42, the current mirror 34[x] supplies the charge current to the trace line 42. Since the sample switch SMP is currently on in this phase, a mirror current proportional to the charge current is simultaneously generated and flows to the output node VOUT. The capacitor C0 acting as an integrator which will accumulate the mirror current to establish the output voltage VOUT for further use of the back-end circuit. When a touch induces a capacitance variation on Cxy in the capacitance units 44, the charge current of the current mirror 34[x] varies in amount, and thereby makes the output voltage VOUT obtained by the output capacitance C0 different.

Figure 9:
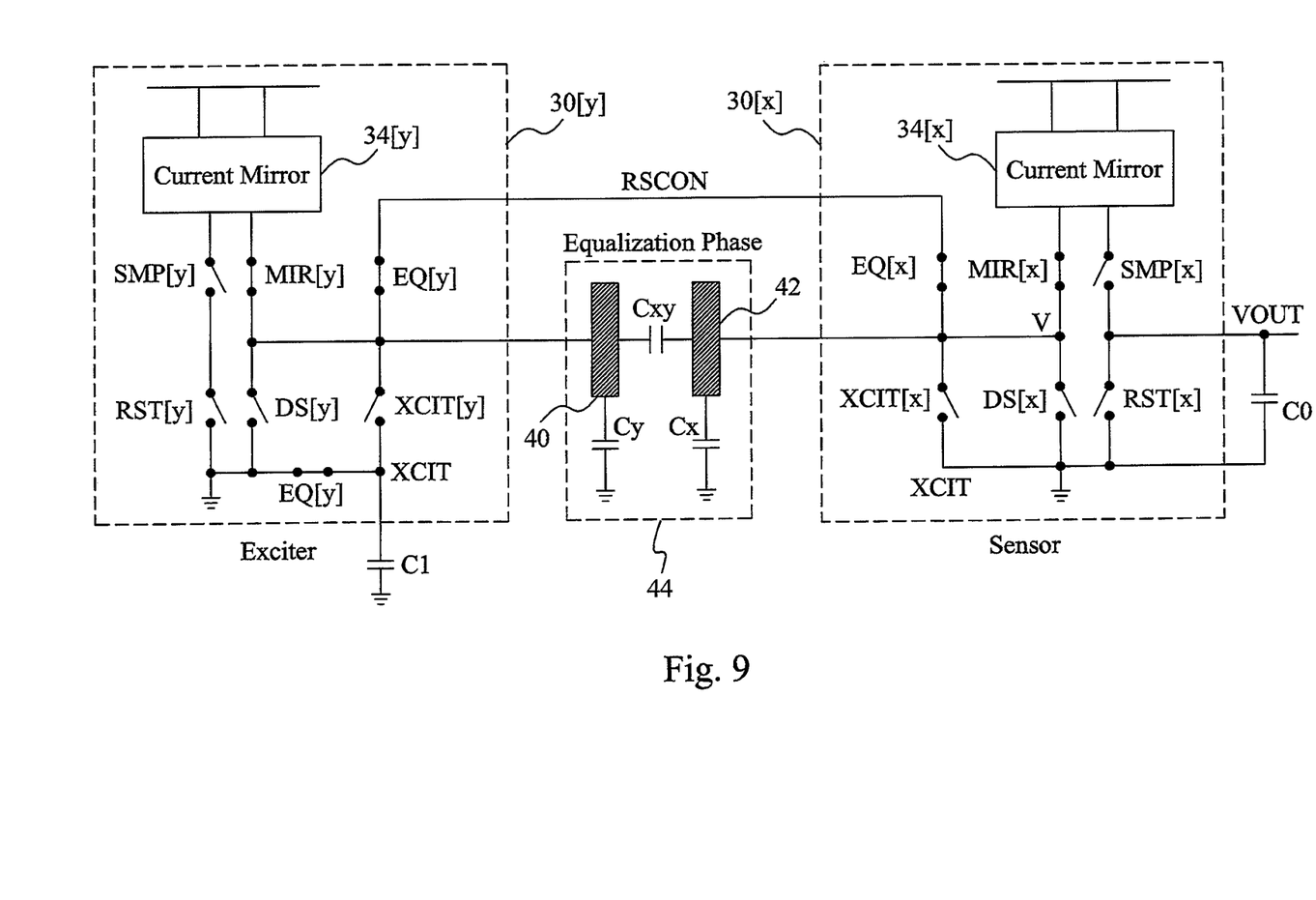
FIG. 9 is a circuit diagram of a sensing arrangement during an equalization phase in a second embodiment according to the present invention.
Figure 10:
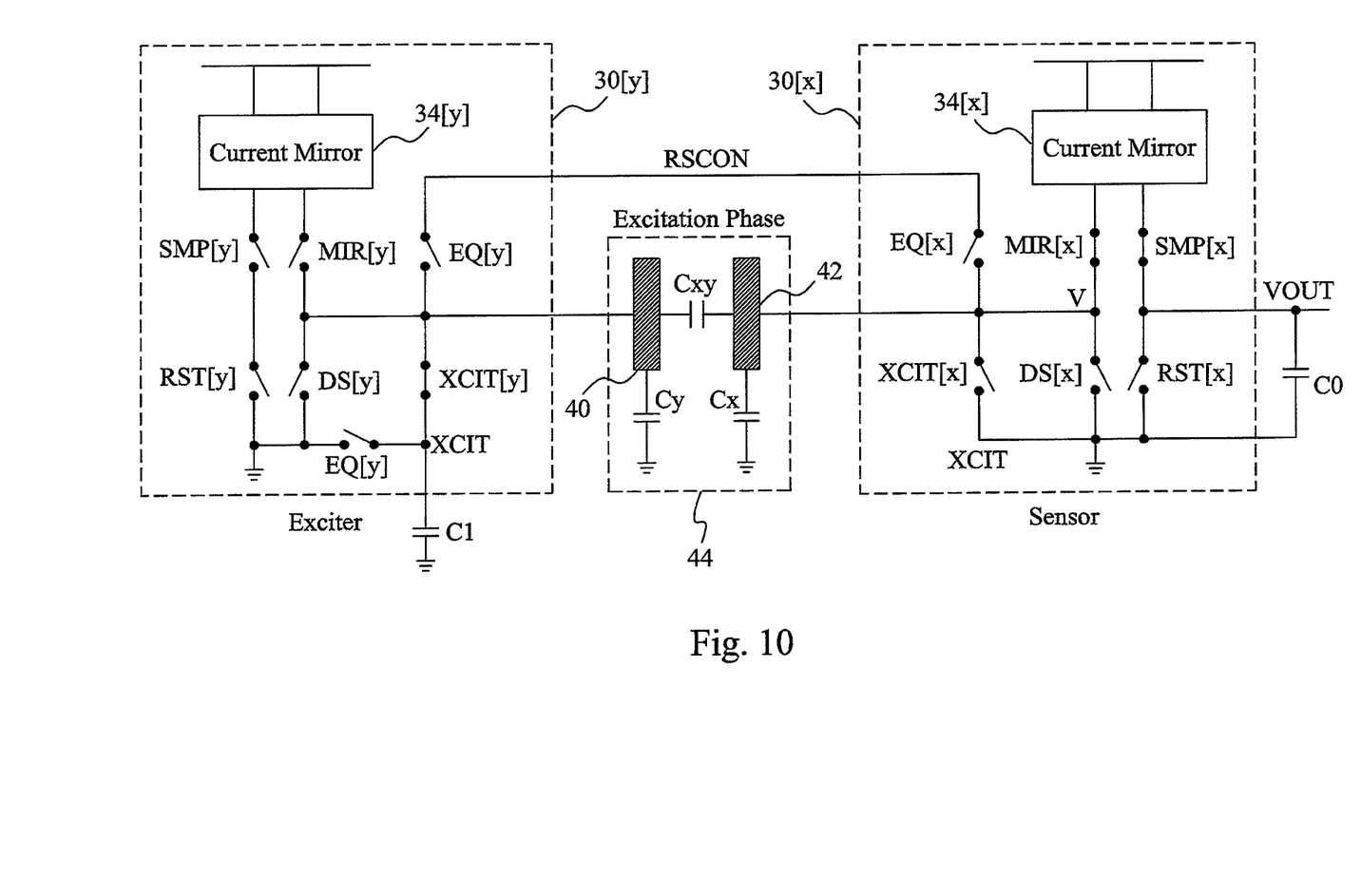
FIG. 10 is a circuit diagram of the sensing arrangement shown in FIG. 9 during an excitation phase.

FIGS. 9 and 10 illustrate a second embodiment of a sensing method using the sensing unit 30 according to the present invention. This embodiment is similar to the case shown in FIGS. 7 and 8, except that the excitation node XCIT of the sensing unit 30[y] is connected to a large capacitor C1. During the equalization phase, as shown in FIG. 9, the sensing units 30[x] and 30[y] have the switches EQ[x], EQ[y], MIR[x] and MIR[y] on, so the equalization line RSCON balances the trace lines 40 and 42 to a same voltage level, and the capacitor C1 is set to a low voltage, for example grounded. Then, the sensing arrangement switches to the excitation phase, as shown in FIG. 10, the sensing unit 30[y] turns off the equalization switch EQ[y] and turns on the excitation switch XCIT [y], so that the trace line 40 is connected to the capacitor C1, thereby the voltage of the trace line 42 declining by a smaller amount than that in the embodiment of FIG. 8. The charge current provided by the current mirror 34[x] for compensating the voltage of the trace line 42 will be also smaller than that in the embodiment of FIG. 8. Although the sensitivity may degrade accordingly, the sensing unit 30[y] is allowed to operate with reduced power consumption, thereby saving energy.

Referring to FIG. 2 again, when the sensing unit 30 operates with the fixed-driven mode, in the switch arrangement 32, only the excitation switch XCIT is kept on to connect the trace line TRACE to the excitation node XCIT for continuously driving this trace line TRACE. When the sensing unit 30 operates with the non-driven mode, all the switches EQ, XCIT, MIR and OS are off and thus the trace line TRACE becomes floating. These two operational modes may be applied to other traces of the touch panel depending on demands for sensing process.

Figure 11:
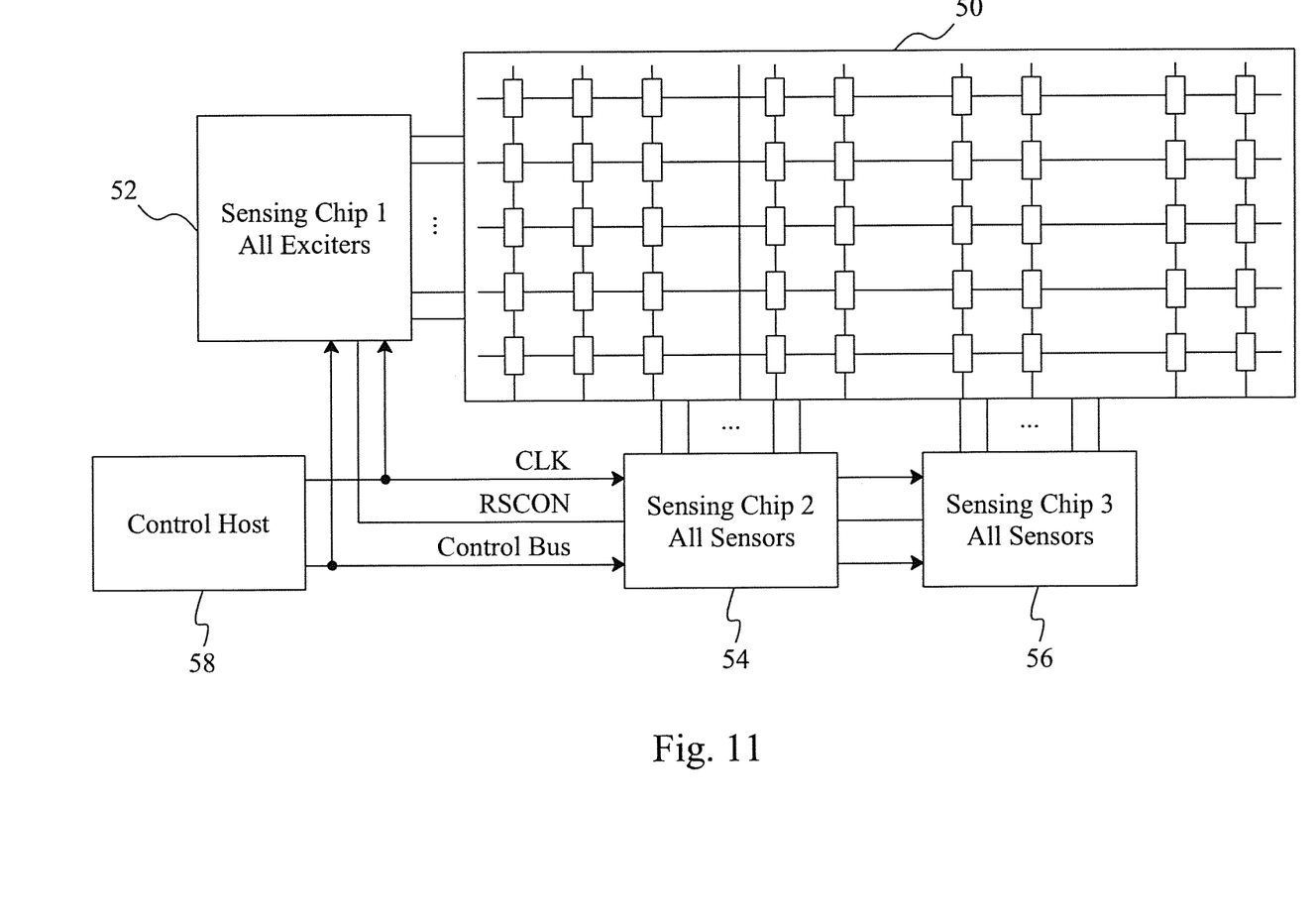
FIG. 11 is a schematic drawing demonstrating a cascading structure of sensing chips according to the present invention for large touch panel application.

For a touch panel with traces number larger than available sensing units on a sensing chip, a cascading structure can be applied. As shown in FIG. 11, a two-dimensional touch panel 50 is connected with sensing chips 52, 54 and 56 having the sensing units 30 according to the present invention, in which the sensing chip 52 connects the trace lines in a first direction, and the sensing chips 54 and 56 connect the trace lines in a second direction. The sensing units 30 in the sensing chip 52 are all configured to be the exciter mode solely to operate as exciters to generate voltage change on each trace line in sequence according to the setting of a control host 58. The sensing units 30 in the sensing chips 54 and 56 are all configured to be the sensor mode to operate as sensors. The equalization line RSCON connects the sensing chips 52, 54 and 56. All the sensing chips 52, 54 and 56 are synchronized with a common clock CLK and a same control bus, and are supervised by the control host 58, for sensing the touch panel 50 to generate sensed information.

Figure 12:
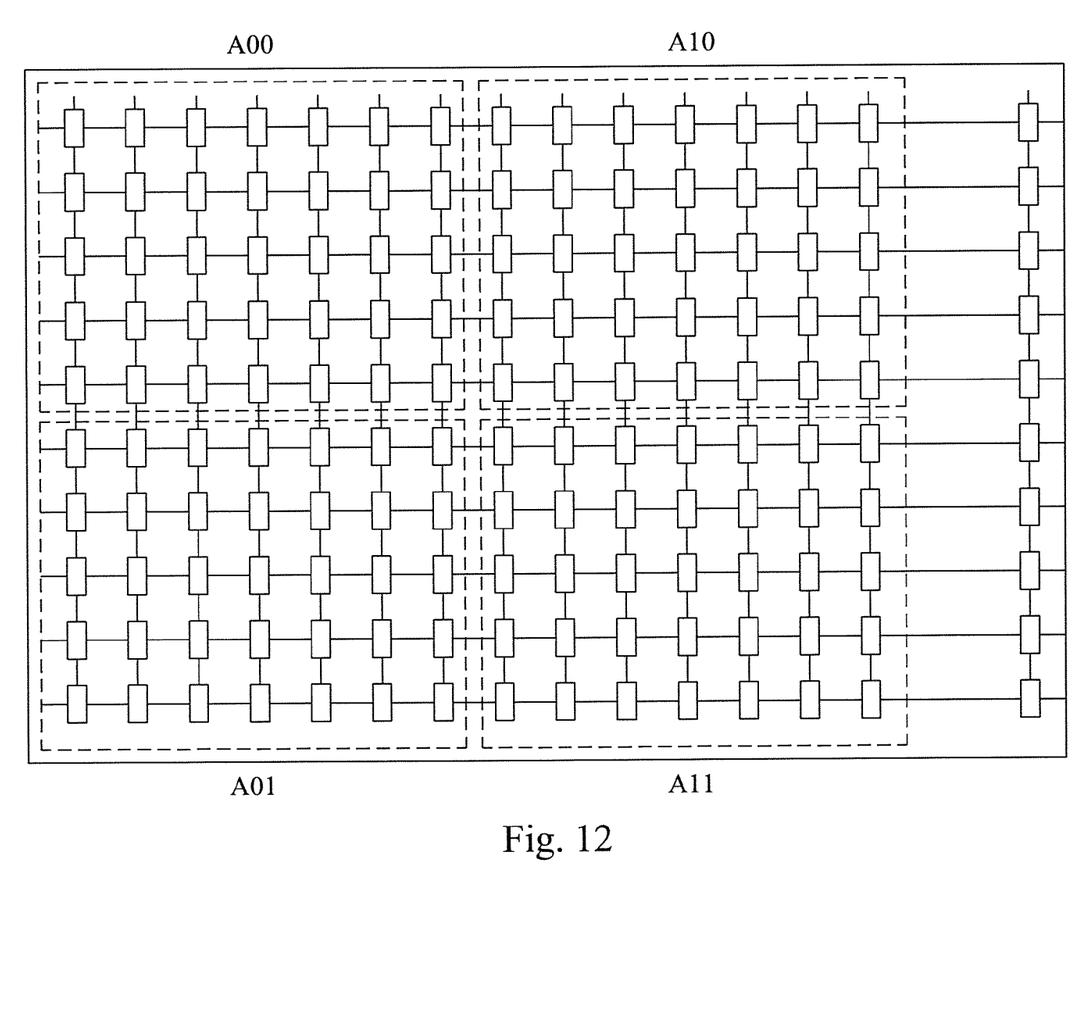
FIG. 12 is a schematic drawing showing an area partition scheme used in a hybrid sensing method according to the present invention.

Although the cascading structure shown in FIG. 11 is useful for large touch panel application in hardware demand, scanning all intersection points of the trace lines one by one can adversely affect the frame rate. The present invention further provides a sensing method for large touch panel application, which includes a hybrid sensing approach to facilitate reducing operational complexity, saving sensing time and improving the frame rate. FIG. 12 is a schematic drawing showing an area partition scheme for a hybrid sensing method according to the present invention, in which a touch panel is defined with a plurality of area partitions A00, A01, A10, A11, etc. under a preset rule. For each area partition, during a sensing period, by setting all the sensing units of the trace lines in a first direction as the exciter mode, and setting all the sensing units of the trace lines in a second direction as the sensor mode, the combination of the exciters and sensors can sense the accumulated mutual capacitance change between the trace lines driven by the exciters and sensors. This sensing of accumulated mutual capacitance change is named as projected mutual capacitance sensing, with which the accumulated capacitance change on each area partition can be detected. To reduce operational complexity and improve frame rate, the predefined projected mutual sensing can be first applied to detect if there is any object approaching an area partition Aij of the capacitance units, if the system detects significant capacitance variation within the projected area partition, the subset of area image can be further scanned for locating the object position. In another embodiment, the area partitions are so defined that each two adjacent area partitions overlap mutually around the boundary therebetween. In other words, the trace lines near a periphery of an area partition are also a part of another area partition adjacent thereto.

Figure 13:
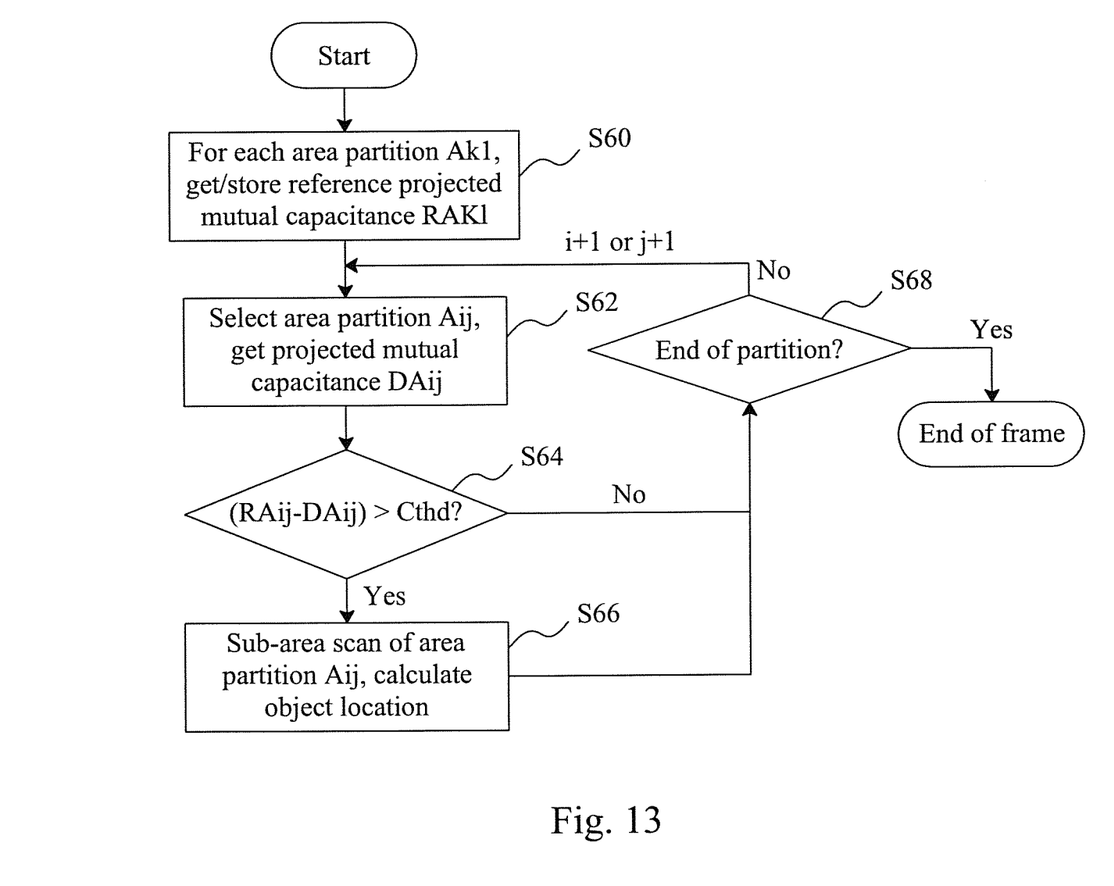
FIG. 13 is a capacitance sensing flow of a hybrid sensing method according to the present invention.

FIG. 13 is a capacitance sensing flow for a hybrid sensing method according to the present invention. Prior to sensing; a touch panel is defined with a plurality of area partitions A00, A01, A10, A11, etc. as illustrated in FIG. 12. In this embodiment, step S60 senses and stores each area partition Akl when the touch panel is free of object to prepare the reference projected mutual capacitance RAkl, and then all the area partitions are scanned one by one. Step S62 selects an area partition Aij to sense its projected mutual capacitance DAij for being compared with the reference projected mutual capacitance RAij of the selected area partition Aij in step S64. If the difference therebetween is larger than a threshold Cthd, it is identified as a touched area partition and the process goes to step S66 for sub-area scan of this area partition Aij to calculate the object location. After step S66, or when the difference between RAij and DAij is detected smaller than the threshold Cthd in step S64, the process goes to step S68 to confirm whether all the area partitions have been sensed, and if not, the process returns to step S62 for sensing the next area partition by increasing the parameter either i or j by one; otherwise, the process terminates after a whole frame has been sensed.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

The invention claimed is:

1. A sensing arrangement for touch panel application, comprising:
    a first sensing unit connected to a first trace line, when the first sensing unit operates with an exciter mode, the first sensing unit has a first phase and a second phase, and switches the first trace line to connect to an excitation node during the second phase; and
    a second sensing unit connected to a second trace line and connected to the first sensing unit through an equalization line, when the second sensing unit operates with a sensor mode, the second sensing unit has the first phase and the second phase, and supplies a charge current to the second trace line and generates a mirror current proportional to the charge current during the second phase;
    wherein the first and the second sensing units use the equalization line to balance the first and second trace lines to a same voltage level during the first phase;
    wherein the first sensing unit comprises:
        a first equalization switch connected between the first trace line and the equalization line;
        an excitation switch connected between the first trace line and the excitation node; and
        a first current mirror connected to the first trace line through a charge switch;
    wherein the second sensing unit comprises:
        a second equalization switch connected between the second trace line and the equalization line;
        a second current mirror operative to supply the charge current and generate the mirror current; and
        a sample switch connected between the second current mirror and the output node.

2. The sensing arrangement of claim 1, wherein the excitation node is grounded.

3. The sensing arrangement of claim 1, further comprising an integrator connected to the output node for accumulating charges of the mirror current so as to generate an output voltage.

4. The sensing arrangement of claim 3, wherein the integrator comprises a capacitor.

5. The sensing arrangement of claim 3, further comprising a reset switch connected to the output node for resetting the integrator.

6. The sensing arrangement of claim 1, wherein the second sensing unit further comprises:
    a second charge switch connected between the second trace line and the second current mirror; and
    a ground switch connected between the second trace line and a ground node.

7. The sensing arrangement of claim 6, wherein the second sensing unit further comprises a second excitation switch connected between the second trace line and a the excitation node.

8. The sensing arrangement of claim 1, wherein the first and second sensing units are located in two different sensing chips, respectively.

9. The sensing arrangement of claim 1, wherein the multiple operational modes further comprises a fixed-driven mode for fixing the second trace line to the excitation node.

10. The sensing arrangement of claim 1, wherein the multiple operational modes further comprises a non-driven mode for making the second trace line floating.

\* \* \* \* \*